United States Patent [19]

Pollacco

[11] Patent Number: 4,524,866

[45] Date of Patent: Jun. 25, 1985

[54] MOTOR OIL CATCH PAN AND MOTOR OIL CHANGE KIT INCORPORATING THE SAME

[76] Inventor: Paul J. Pollacco, 3819 Burlingame Pl., Alexandria, Va. 22309

[21] Appl. No.: 588,052

[22] Filed: Mar. 9, 1984

[51] Int. Cl.³ .............................................. B65D 85/00
[52] U.S. Cl. ................................... 206/223; 184/106; 184/1.5; 141/98; 220/1 C; 220/DIG. 6
[58] Field of Search ...................... 206/223, 216, 504; 184/106, 1.5; 220/1 C, DIG. 6; 215/1 C, 6

[56] References Cited

U.S. PATENT DOCUMENTS

| Re. 27,449 | 8/1972 | Bortz | 184/106 |
|---|---|---|---|
| 2,326,414 | 8/1943 | Thompson | 215/6 X |
| 3,703,956 | 11/1972 | Oswalt | 206/223 |
| 4,098,398 | 7/1978 | Meyers | 206/223 |
| 4,114,660 | 9/1978 | Arruda | 184/106 |
| 4,133,356 | 1/1979 | Dillingham | 206/223 |
| 4,296,838 | 10/1981 | Cohen | 184/106 |
| 4,442,936 | 4/1984 | Densham | 206/223 |

Primary Examiner—Joseph Man-Fu Moy

[57] ABSTRACT

An oil catch pan is provided as a self-supporting structure having a bottom wall and an upstanding peripheral sidewall with a rim where the pan is open at the top. The pan is designed to be slid under an automotive motor vehicle and used to catch the oil being drained from the crankcase. The bottom wall of the pan is initially provided with a closure which is designed to be effectively opened, e.g. by pulling a conveniently located tab or by interaction with a piercing structure which is fitted between the pan and the jug.

15 Claims, 7 Drawing Figures

MOTOR OIL CATCH PAN AND MOTOR OIL CHANGE KIT INCORPORATING THE SAME

BACKGROUND OF THE INVENTION

In the prior U.S. Pat. No. 4,403,692, of William F. Pollacco, issued Sept. 13, 1983, there are disclosed several utilitarian designs of motor oil change kit, especially adapted to be bought and used by "do-it-yourselfers", particularly, persons changing the engine crankcase oil of their own motor vehicle, or performing a like task for a friend, at a site removed from a gasoline station, commercial automotive repair facility or the like.

At any time when automotive engine oil is changed at a site which is not located right at a commercial facility that has a regular system for catching used oil and recycling it or disposing of it properly, there is all too high a likelihood that the used oil will be improperly disposed of at a place where it will contaminate the soil, the air, drinking water and/or the food chain on which we all depend.

Some potential do-it-yourself oil changers are reticent to undertake the task, or perform such maintenance all too infrequently, because of the potential messiness of catching the old oil, and of uncertainty in how to go about disposing of it properly and without spills.

Many of these problems are solved by use of the oil change kit and system which are described in the aforementioned U.S. patent of Pollacco.

For prototyping and further development a motor oil change kit according to the third embodiment, FIGS. 5-9 of the Pollacco patent was selected, with a plan to omit the disclosed drain pan cover in favor of the disclosed frangible wrapping band for initially keeping the kit parts assembled together. The prototype, as with the fourth embodiment, would use a standard new oil jug with a usual upwardly projecting neck having a screw cap. According to the preferred form of that embodiment as disclosed, the jug of new oil initially comes to the user nested in a drain pan. The user de-nests these kit parts, closes-off the bottom outlet of the drain pan, drains the old oil from the crank case into the drain pan, pours the new oil from the jug into the filler tube of the automotive engine, then supports the drain pan of old oil on the empty jug and then opens the bottom outlet of the drain pan allowing the old oil to drain into the jug, whereupon the jug of used oil could be recapped and taken to an oil recycling station and the empty, used drain pan turned-in at the same place, or discarded.

The means disclosed in the aforementioned U.S. patent of Pollacco for openably closing the bottom hole in the drain pan is a so-called Cap-n-Plug closure comprising an externally threaded plug secured on a rod headed by an internally threaded cap. The rod is disclosed to be sufficiently long, that when the plug is in place and oil is drained into the drain pan until the crankcase has been substantially drained, the cap remains high and dry above the surface of the old oil in the drain pan. Thus the user, after he or she has supported the drain pan of old oil on the empty jug can easily remove the plug by twisting the cap, and not get his or her hands dirtied. The cap portion of the closure could then be used to re-cap the jug, now full of old oil, for convenience in returning the old oil to an oil recycling station, or in otherwise properly disposing of the old oil.

Early in the commercial prototyping and developing process, it began to appear that the particular Cap-n-Plug closure means earlier chosen for temporarily stoppering the drain opening in the bottom of the catch pan for old oil would lead to undue complexity in the manufacturing process. Accordingly, although we remain utterly convinced of the soundness of the broader principles of the oil change kit and system as disclosed in the aforementioned U.S. Pat. No. 4,403,692, of Pollacco, we were so stimulated by the prospect of commercializing a convenient and environmentally sound means for enabling the do-it-yourselfer to change his or her motor vehicle engine oil, that we have proceeded to improve the used oil catch pan, the means for temporarily closing the drain opening of the used oil catch pan, and the way that the used oil catch pan may be supported on the emptied new oil jug, for draining the used oil into the jug.

SUMMARY OF THE INVENTION

An oil catch pan is provided as a self-supporting structure having a bottom wall and an upstanding peripheral sidewall with a rim where the pan is open at the top. The pan is designed to be slid under an automotive motor vehicle and used to catch the oil being drained from the crankcase. The bottom wall of the pan is initially provided with a closure which is designed to be effectively opened, e.g. by pulling a conveniently located tab or by interaction with a piercing structure which is fitted between the pan and the jug.

The principles of the invention will be further discussed with reference to the drawings wherein preferred embodiments are shown. The specifics illustrated in the drawings are intended to exemplify, rather than limit, aspects of the invention as defined in the claims.

DETAILED DESCRIPTION

Figure 1:
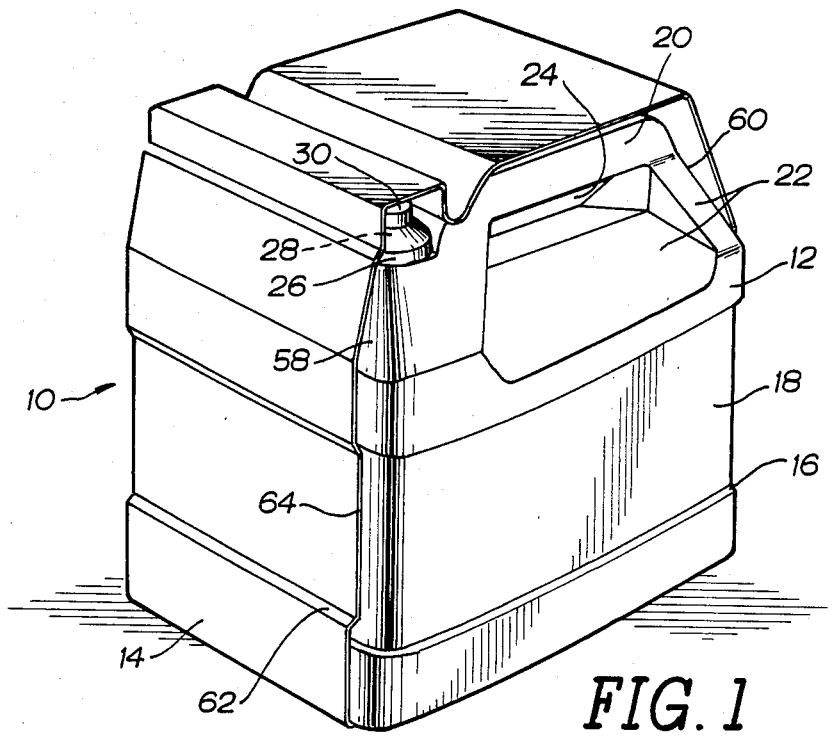
FIG. 1 is a perspective view looking toward the front of an oil change kit including a generalized embodiment of the improved motor oil catch pan constructed in accordance with principles of the present invention.
Figure 2:
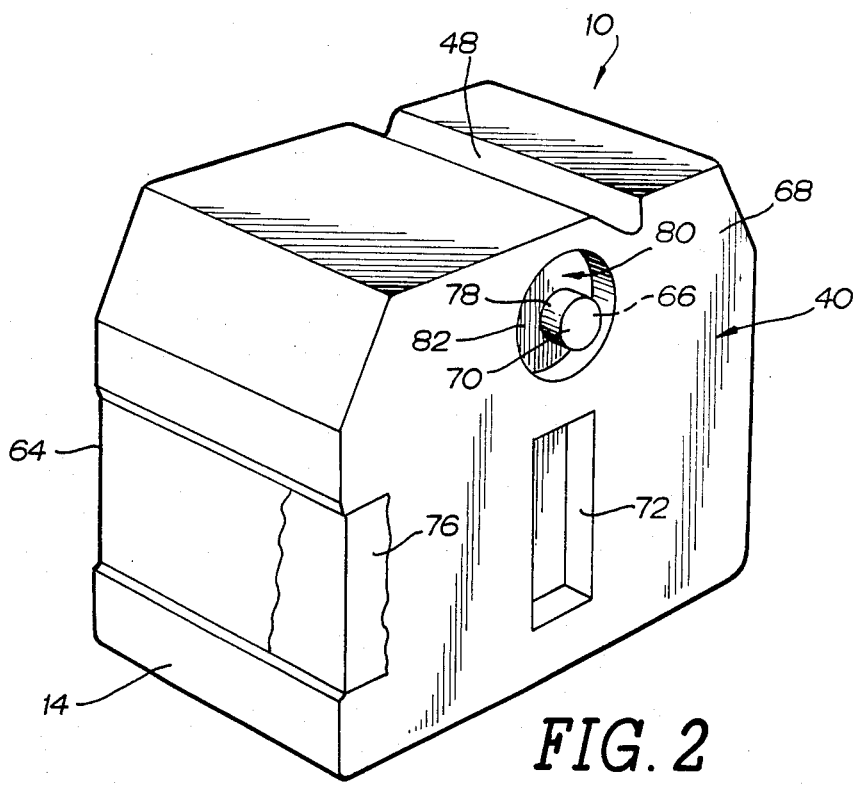
FIG. 2 is an opposite perspective view thereof.

In FIGS. 1 and 2 there is shown a typical, assembled oil change kit according to a generalized embodiment of the invention. This kit 10 is shown including a jug 12 of new oil nested in an oil catch pan 14 (sometimes referred to as a drain pan).

By preference, the jug of new oil is an utterly conventional blow-molded polystyrene plastic jug 12 of sufficient capacity, e.g. four quarts or five quarts, to fill or substantially fill the automotive engine crankcase oil reservoir of a given engine, make model and year of car, truck or other motor vehicle. One suitable jug is the depicted four-quart plastic container available from Penn Plastics Incorporated, Creighton, Pa. 15030-0297. This jug is generally rounded-corner rectangular as seen in side, end and bottom views; perimetrically around its middle, it includes a broad, slightly indented waist 16 which is constructed and arranged to receive and display a label 18, which may be constituted by an imprinted band of plastic shrink film applied and shrunk into place. This jug also includes an integral hollow handle 20 which loops medially upwards out of its generally pyramidal top wall 22, providing an open slot 24 through which a user's fingers may curl to grasp the handle. A tubular neck 26 through which the jug may be filled and emptied by pouring is medially based on the top wall 22 at one end thereof, beside one end of the handle 20; it projects generally upwards and its open mouth 28 at the upper end may be closed by use of a suitable closure arrangement 30. In the instance depicted, the closure arrangement takes the form of a circumferential band of external threading 32 on the neck 26 near the mouth 28 and an internally screw threaded cap 34 provides the closure arrangement. The jug 12 is self-supporting, in the sense that it is capable of sitting upright on its generally flat bottom wall 36, in usual conditions of fullness/emptiness, without needing to be externally confined, e.g. in a bag-in-box sense.

Looking at the preferred jug 12 from the side, one notices that there is a dip or notch 38 of generally triangular form in the profile of its upper extent, this dip or notch 38 being between the handle 20 and the neck 26.

The oil catch pan or drain pan 14 may be molded, e.g. by pressure/vacuum thermoforming, out of much the same material, e.g. polystyrene, as is used to make the jug 12. As an alternative, it may be molded of synthetic foamed plastic, e.g. polystyrene or of paper pulp, in substantially the same way and using substantially the same material as is presently commercially used in the manufacture of egg cartons, flower pots and the like. Where the pan is made of molded paper pulp, it should be tested for its ability to contain engine oil at normally encountered temperatures, for a reasonable period of time, e.g. for a two-day period of time. Appropriate barrier oil-proofing fillings/coatings may be used, e.g. a coated or lamineteed lining of aluminum foil, polyethylene terephthalate, polyvinylidene chloride and multilayer combinations, with or without coatings of complex organic compositions containing resins or waxes, i.e. the whole range of materials used for coating composite cans of motor oil may be used.

In contrast to the jug 12 which may be a commercially available item, as an improved utilitarian construction, the pan 14 is a creation of the present invention.

Figure 3:
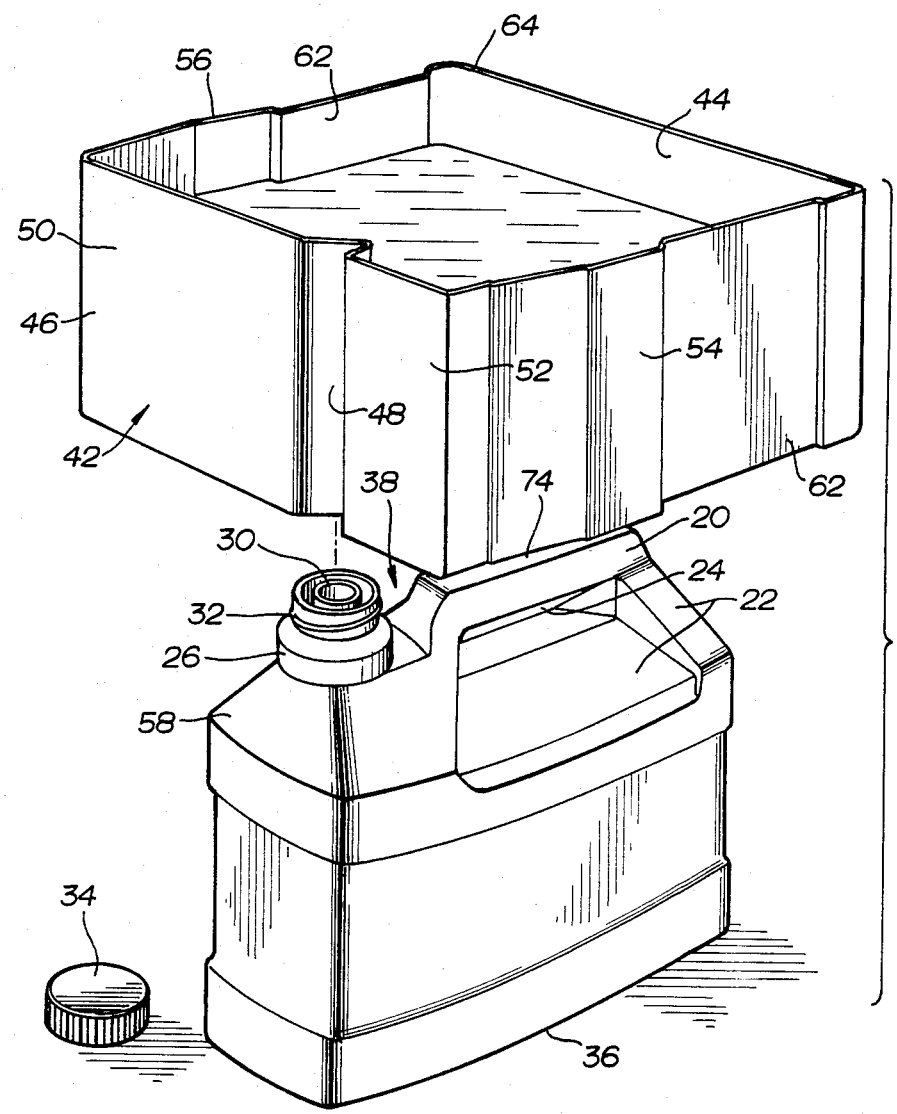
FIG. 3 is a diagrammatic exploded perspective view showing the oil catch pan full of used oil being aligned with and supported on the emptied new oil jug, the cap of which has been saved for recapping the jug once it is full of old oil drained from the oil catch pan.

The pan 14 is shown supported on one of its sides in FIGS. 1 and 2, and resting on its bottom wall in FIG. 3. For convenience in description, the orientation shown in FIG. 3 will be assumed to be the working orientation and thus the fundamental orientation of the pan 14. Accordingly, e.g. item 40 is termed a "bottom wall" of the pan 14, even though it is disposed as a side in FIGS. 1 and 2, and correspondingly one of the "upstanding sidewalls" 42 which ring the perimeter of the bottom wall 40 is disposed as a bottom in FIGS. 1 and 2.

By preference, the bottom wall 40 (and thus the sidewalls 42 as considered in plan figure) have an outline which substantially mimics, replicates, repeats or at least generally follows the corresponding line and surface features of the side elevational profile of one or more particular designs of jug 12 that will be used with the pan in the kit 10. Accordingly, in the instance depicted, the sidewall 44 is flat, the opposite sidewall 46 has an inward convolution 48 corresponding in profile to the dip or notch 38 and on either side of this convolution, respectively, an outward convolution 50 corresponding in profile to the capped neck 26/30 and an outward convolution 52 corresponding in profile to the outside of the loop of the handle 20. The other two sidewalls 54, 56 are generally parallel, except near the sidewall 46, where they begin to converge, corresponding to the end profile segments 58, 60 of the top wall 22 of the jug 12. The sidewalls 54, 56 are shown provided at sites corresponding to that of the waist 16, with shallow, broad inward convolutions 62.

At its furthest extent from the bottom wall 40, the sidewalls 42 terminate in a rim 64 which outlines the open top of the pan 14.

The bottom wall 40 of the pan, preferably at a medial site corresponding to the location of the handle slot 24 when the jug 12 is nested in the pan is provided with a drain opening 66, e.g. a circular opening which, by preference does not project outwardly beyond the plane of the bottom wall 40. Accordingly, the pan may be rested flat on its bottom wall outer surface 68, and kits 10 including the pans 14 may be packed, e.g. four to a shipping carton, without any protruding drain outlet interfering with support or packing efficiency. According to presently preferred embodiments of the invention, in the kit 10 or drain pan 14 as purchased by the do-it-yourselfer, the drain opening 66 is sealed closed, e.g. by a wafer seal 70 of foil/film laminate (e.g. of aluminum/polyethylene) of the same type and secured in the same manner, e.g. by pressure sensitive or hot melt adhesive, as are tamper-evident bottle-mouth seals presently commercially used for protecting soft drinks, foods, vitamins and drugs and the like in consumer packages sold at supermarkets and drug stores. The weight and character of the seal 70 should be such as to prevent its being accidentally ruptured or punctured in transit from the point of manufacture to the point of use, and sufficiently strong as to bear the weight of old oil drained into the pan without prematurely failing.

Also by preference, the bottom wall 40 of the pan 14 is provided with some structural feature or contouring 72 which tailors the pan 14 to reliably be stably supported on the jug 12 at a time when the pan 14 is full of old oil to be drained into the jug 12, and the jug 12 is in a substantially empty condition, having been emptied of its original, new oil contents. The stability problem generally will be its greatest at this moment, when draining from the pan into the jug is begun, because of the comparative height of the center of gravity of the pan-on-jug unit at this stage, and the comparative lateral dimension of the full pan compared to its base, the empty jug. In the instance depicted, the stacking support feature 72 takes the form of an outwardly facing medially-located elongated recess formed in the bottom wall 40 of the pan, this recess being sized, shaped and located to receive the upper surface and shoulder portion 74 of the handle 20 of the jug when the pan 14 is supported on the jug 12 with the drain opening 66 is aligned with and at least slightly telescoped with the tubular neck 26 of the jug.

As shown, and by preference, the height of the sidewalls 42 of the pan 14 is somewhat less than the depth to which the jug 12 of new oil will nest into the pan (FIGS. 1 and 2), so that when these two structures are nested to form a kit, the composite unit may still be conveniently carried by curling one's fingers through the handle slot 24 and lifting, practically the same as one would were one lifting and carrying the jug by itself.

In some instances, the snugness of the fit of the jug 12 in the pan 14 may be sufficient to keep these kit parts together. However, in most instances, it will be necessary to assure the connection together of these kit parts by additional means, such as by banding with a label 76 kept properly positioned by receipt in the recesses 62 and 16. This label may be made of paper, shrink-wrap plastic film or the like, and it would be broken or otherwise removed by the consumer in order to denest the kit parts. Of course, where the consumer buys the jug 12 of new oil, and the pan 14 separately, but at the same store, the jug 12 may be nested in the pan 14 at the point of sale, and kept associated for the trip home from the store by any convenient means, e.g. by a couple of pieces of pressure-sensitive adhesive tape or by being placed in a nested condition in a kraft paper bag or a cardboard box, such as are used at the checkout counter for packing items purchased at grocery stores, automotive supply stores and the like.

Once the consumer/user has purchased the new oil and the catch pan 14, whether together in a kit or separately, and has come to the vehicle to change its engine oil, he or she slides the catch pan 14, on its bottom, under the vehicle, until it is centered under the engine crankcase drain plug. Next the drain plug is opened and all the old oil is allowed to drain into the catch pan 14 through the relatively large open top of the catch pan 14. The drain plug is then closed and the jug 12 of new oil is opened by removing its cap 34, and emptied into the engine oil filler tube of the vehicle until the jug 12 is substantially empty. Next, the pan 14 full of old oil is retrieved from under the vehicle by sliding it out from under or by driving the vehicle sufficiently forward or backward. The empty, uncapped jug 12 is set stably on its flat bottom 36 beside the pan 14 full of old oil, and the latter is carefully lifted and set on the former so that the drain opening 66 is aligned with the mouth 28 of the tubular neck 26, and the stacking support feature 72 is supported on the top of the jug 12, e.g. the top and shoulder portion 74 of the jug handle 20 is received in the recess 72.

By preference, the drain opening 66 of the pan bottom is through a neck 78, which does not protrude outwardly of the plane of the bottom wall of the pan 14, due to the fact that it is based in a ring-shaped recess 80 formed in the bottom wall 40 perimetrically of the neck 78. Thus, the resting of the surface 82 of this recess 80 on the neck 26 may further act to stabilize the pan on the jug. Accordingly, as the pan rests on the jug, the neck 78 of the pan preferably telescopes a short distance into the neck of the jug.

By means further discussed below in relation to FIGS. 4-7, the seal 70 in the catch pan drain outlet 66 is then removed, opened, broken, broached or otherwise rendered ineffective, so that substantially all of the old oil drains from the pan 14 into the jug 12. The jug 12, now full of old oil may be recapped by screwing the cap 34 back on tight and the thus-sealed jug 12 of old oil taken to a used oil collection station or otherwise properly disposed of. The now empty pan 14, if not reuseable, may be discarded.

What is shown in FIGS. 4-7 and described hereinbelow are some presently preferred ways and means for opening up the seal 70 so that the used oil can drain from the pan 14 into the open, empty jug 12 without the do-it-yourselfer having to dip into the old oil to get at the seal.

Figure 4:
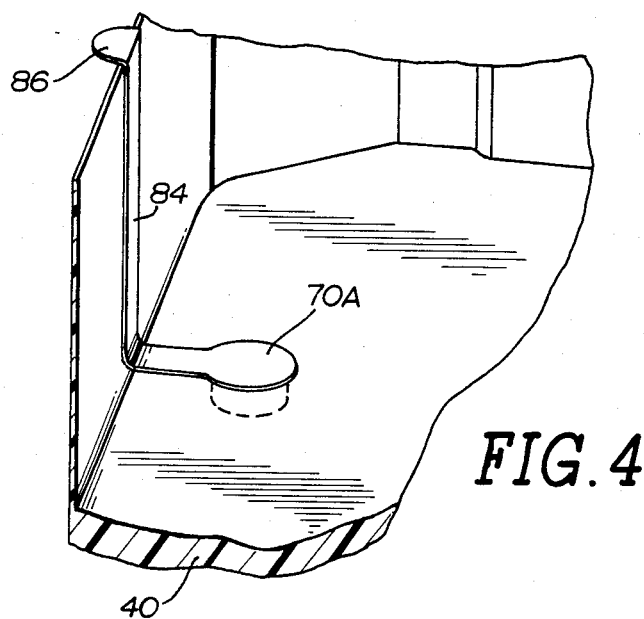
FIG. 4 is an enlarged scale fragmentary perspective view of the oil catch pan, showing details of a first embodiment.

In the version shown in FIG. 4, the seal 70A is provided with a rip cord, pull tab, tape or the like 84, e.g. in much the same manner that the familiar foil/film pressure sensitive adhesive coated seals used to close the key-shaped mouths of 12-ounce beverage cans of non-carbonated drinks such as V-8 ® vegetable juice are provided with laterally extending, elongated non-adhered tab portions which may be lifted and pulled up to pull the seal bodily away from the opening. However, in the present instance, because the seal 70A is in the bottom of a vessel rather than on its lid, the pull tab 84 must be sufficiently elongated that its free end 86 is available at a site above the liquid level. A useful conceptual analogy is the tag and string or tape attached to a tea bag, where the tag 86 on the free end is initially hung over the edge of the container, so that it may be grasped and pulled up without the user dipping into the liquid. Thus the seal 66 may be pulled out as simply as one removes a tea bag from a tea pot or cup of tea. So that the user will not forget, the manufacturer may temporarily adhere or otherwise secure the tag 86 to the outside of the pan 14 or, if inside, on the sidewall at such a height as to remain accessible above the level of the old oil when the pan is full of old oil drained from the vehicle.

Figure 5:
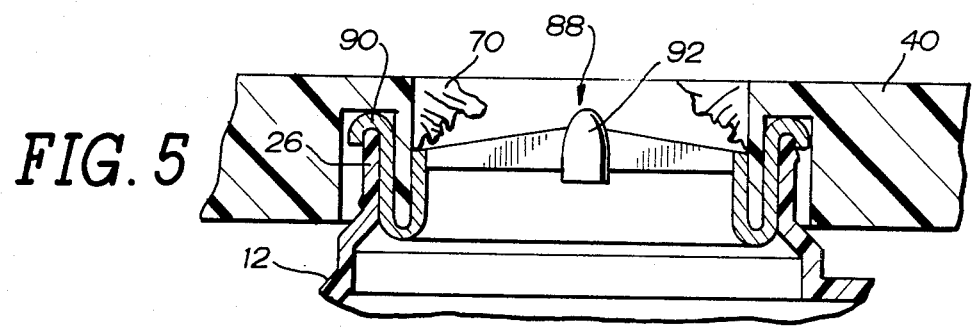
FIG. 5 is an enlarged scale fragmentary vertical sectional view of the oil catch pan and jug, showing details of a second embodiment.

In the version shown in FIG. 5, the oil change kit is further made to include a small piercer unit 88, e.g. made of paper clip-type wire, or molded of plastic or the like. This piercer unit is made to have a shoulder 90 by which it may be hung on the open neck 26 of the empty jug 12, with its piercer structure 92 disposed generally radially within the confines of the jug mouth 28, and aimed upwards at such a height as to pierce the seal 66 just as the pan of old oil has had its neck 78 telescoped into the open neck 26.

Figure 6:
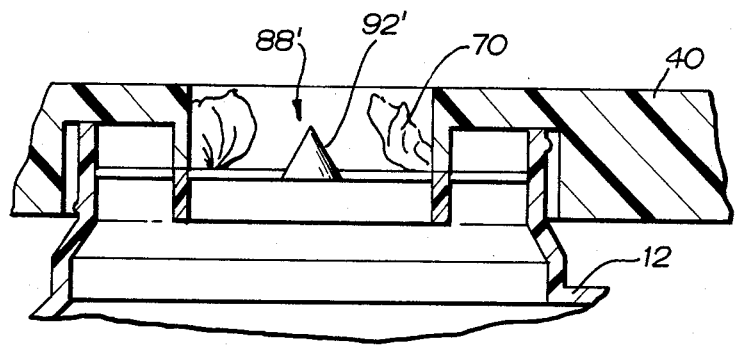
FIG. 6 is an enlarged scale fragmentary vertical sectional view of the oil catch pan and jug, showing details of a third embodiment.

FIG. 6 shows a very similar arrangement in which the piercer unit 88' is built into the neck of the jug 12 so that it comes from the supplier of new oil with a piercer structure 92' already in place.

Figure 7:
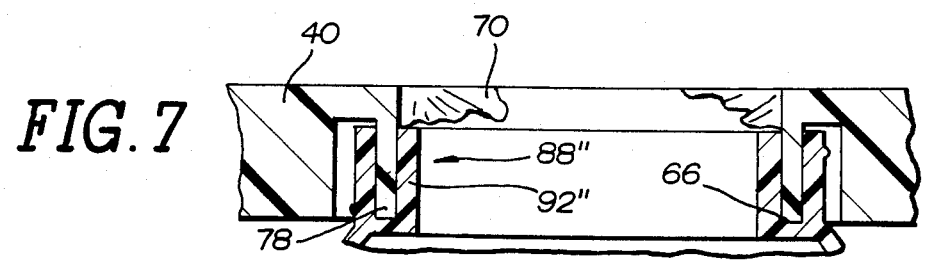
FIG. 7 is an enlarged scale fragmentary vertical sectional view of the oil catch pan and jug, showing details of a fourth embodiment.

A further variation is shown in FIG. 7, wherein the built-in piercer unit 88", instead of having a piercer structure located bulls-eye fashion on the geometric center line of the jug neck, has its piercer structure 92" provided as a concentric upstanding flange mounted to the jug neck near the internal peripheral wall of the jug neck, but spaced sufficiently radially inwards that as the seal-bearing pan outlet neck 78 telescopes into jug neck 26, the piercer structure 92" must telescope into the opening 66, whereupon the seal 70 is broken by the piercer flange 92".

It should now be apparent that the improved motor oil catch pan and motor oil change kit incorporating the same as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A do-it-yourselfer's oil catch pan, for use with an openably and reclosably capped jug of new oil sufficient to fill or at least substantially fill the engine oil reservoir of a pre-selected motor vehicle to its proper level, said oil catch pan comprising:

a self-supporting container sized and configured to fit under a motor vehicle crankcase and having a bottom wall and a peripheral sidewall with a top opening for receiving used oil drained from the crankcase;

said bottom wall of said container having means providing a seating surface means cooperable with said jug for enabling the oil catch pan to be seated on the jug in overlying relation thereto when the jug is upright, uncapped and emptied of new oil;

said bottom wall of said container having means defining an oil drain aperture formed therethrough;

closure member for said oil drain aperture, said closure member being removably positionable in obstructing relation to said oil drain aperture to block flow of used oil through said oil drain aperture;

said oil drain aperture being constructed and arranged to register with an opening in the jug when the oil catch pan is seated on the jug in overlying relation thereto with the jug in an upright, uncapped, emptied of new oil disposition, for enabling used oil which has been drained into the oil catch pan from the pre-selected motor vehicle through said top opening to be transferred from the oil catch pan to the jug upon manipulation of said closure member to unblock said oil drain aperture, thereby making it unnecessary to pour the used oil out of the oil catch pan through said top opening by tilting or tipping the oil catch pan, so that the used oil may be drained from the oil catch pan into the jug and the jug re-capped for transporting the used oil to a disposal site without spillage;

said closure member comprising:

a seal, means adhering the seal perimetrically to said container bottom wall circumferentially of said oil drain aperture to be irreversibly pulled away or broken for opening said oil drain aperture, and means associable with said seal and actuable without necessitating the user's dipping into the used oil for operatively destroying said seal in relation to said oil drain aperture, so that the used oil may be drained from the oil catch pan into the jug.

2. The oil catch pan of claim 1, wherein:

said bottom wall of said container is generally externally flat so as to have a substantially flat outer support surface, and said oil drain aperture may be arranged to project outwards in substantially, if at all, further than flushness therewith, so that said oil catch pan may be supported substantially flatly on a horizontal surface such as a floor.

3. The oil catch pan of claim 2, wherein:

said seating surface means in said bottom wall comprises means defining an outwardly open recess in said bottom wall, said recess being sized, shaped and positioned to receive and be supported upon a corresponding portion of the jug.

4. The oil catch pan of claim 3, wherein:

said recess is medially located and elongated for receiving a handle top and shoulder portion of the jug; and said seating means further comprises a ring-shaped recess peripherally surrounding said oil drain aperture and providing a recessed neck for said aperture, so that said bottom wall within said ring-shaped recess may rest on a neck portion of the jug as the bottom wall in said elongated recess is supported on the handle top and shoulder portion of the jug.

5. The oil catch pan of claim 1, wherein:

said container is made of oil-proof barrier-coated molded cellulosic pulp.

6. The oil catch pan of claim 1, wherein:

said container is molded of synthetic plastic material.

7. The oil catch pan of claim 1, wherein:

said means for destroying the seal is constituted by a pull tab secured to the seal and extending therefrom to a free end located beyond the level to which used oil can be expected to rise in the container when used oil is being drained thereinto from said pre-selected vehicle, so that after the oil catch pan is full of old oil and juxtaposed on the jug, the pull tab may be pulled from outside the used oil to pull the seal away from the oil drain aperture.

8. The oil catch pan of claim 1, wherein:

said means for destroying the seal is constituted by a seal piercing unit constructed and arranged to be supportable on the jug in puncturingly interfering relation with the seal from below as the oil catch pan is aligned with and lowered onto the jug.

9. A motor oil change kit, comprising:

the oil catch pan of claim 1, denestably nested with a said jug of new oil.

10. The motor oil change kit of claim 9, wherein:

said means for destroying the seal is constituted by a seal piercing unit constructed and arranged to be supportable on the jug in puncturingly interfering relation with the seal from below as the oil catch pan is aligned with and lowered onto the jug.

11. The motor oil change kit of claim 10, wherein:

the jug of new oil has wall means providing an upwardly open neck removably capped by a cap and said oil drain aperture is constructed and arranged to telescopically fit in said upwardly open neck.

12. The motor oil change kit of claim 11, wherein:

said bottom wall of said container is generally externally flat so as to have a substantially flat outer support surface, and said oil drain aperture may be arranged to project outwards in substantially, if at all, further than flushness therewith, so that said oil catch pan may be supported substantially flatly on a horizontal surface such as a floor.

13. The motor oil change kit of claim 12, wherein:

said seal piercing unit is a separable member from both said container and said jug and is constructed and arranged to be hangingly supported, by shoulder means thereof, on said open neck of said jug, with means providing a piercing element thereof projecting upwards and circumferentialy outlined by said open neck of said jug.

14. The motor oil change kit of claim 12, wherein:

said seal piercing unit is mounted to said open neck of said jug and includes means providing a piercing element thereof projecting upwards and circumferentially outlined by said open neck of said jug.

15. The motor oil change kit of claim 11, wherein:

said seal is a circular wafer of flexible foil/film laminate adhered in closing relation to said oil drain aperture.

* * * * *